United States Patent [19]

Link

[11] 3,710,002
[45] Jan. 9, 1973

[54] AN UNDER-GROUND VENTED NON-METALLIC TRANSFORMER ASSEMBLY

[76] Inventor: Edwin A. Link, 317 South Greenfield Avenue, Waukesha, Wis. 53186

[22] Filed: June 9, 1971

[21] Appl. No.: 151,463

Related U.S. Application Data

[63] Continuation-in-part of Ser. No. 15,757, March 2, 1970, abandoned.

[52] U.S. Cl. ............174/18, 174/17 LF, 174/17 VA, 174/37, 220/85 TC, 336/59, 336/90, 336/94, 339/112 R
[51] Int. Cl. ...........................................H01f 27/04
[58] Field of Search....174/11 BH, 12 BH, 14 BH, 15 R,
174/15 BH, 16 R, 16 BH, 17 R, 17 LF, 17 GF, 17 SF, 17 VA, 17 CT, 18, 37, 50, 52 R; 336/58, 59, 90, 92, 94; 200/150 H; 220/18, 85 TC; 339/112 R

[56] References Cited

UNITED STATES PATENTS

| | | |
|---|---|---|
| 2,146,311 | 2/1939 | Pittman et al.................174/17 VA X |
| 2,360,801 | 10/1944 | Steinmayer et al. .............174/18 UX |
| 2,366,290 | 1/1945 | Rudd ..............................174/15 R X |
| 2,478,983 | 8/1949 | Runbaken et al...................336/94 X |
| 2,816,947 | 12/1957 | Leightner et al................174/17 R X |
| 2,947,799 | 8/1960 | Finck ..............................174/18 |
| 2,234,493 | 2/1966 | Zwelling et al ...............336/92 X |
| 3,443,157 | 5/1969 | Uptegraff, Jr. ......................336/94 X |
| 3,504,319 | 3/1970 | Leonard ..............................336/92 X |
| 3,544,938 | 12/1970 | Bergmann et al.................174/18 UX |

FOREIGN PATENTS OR APPLICATIONS

| | | |
|---|---|---|
| 123,018 | 12/1946 | Australia..............................336/94 |
| 429,684 | 7/1911 | France .................................336/90 |
| 20,651 | 0/1890 | Great Britain.........................336/94 |
| 696,201 | 8/1953 | Great Britain.........................174/18 |
| 93,781 | 4/1960 | Netherlands..........................174/50 |
| 124,850 | 3/1928 | Switzerland.....................200/150 H |

OTHER PUBLICATIONS

"A History of the Locke Insulator Corporation," published by Locke Insulator Corporation, Baltimore, Maryland, Sept. 1947, pages 3 and 5 relied on

*Primary Examiner*—Laramie E. Askin
*Attorney*—Ronald E. Barry and James E. Nilles

[57] ABSTRACT

A distribution transformer assembly for an electrical power distribution system, the transformer assembly including a fluid-tight non-metallic enclosure which can be buried in the ground, a distribution transformer having a primary and a secondary winding positioned within said enclosure, said enclosure including sealed primary and secondary electrical terminators or bushings for operatively connecting the transformer to the distribution system and insulating liquid substantially filling said enclosure to dissipate heat losses through the walls of the enclosure to the adjacent ground, at least one of the terminators having a one-way vent to the atmosphere.

14 Claims, 3 Drawing Figures

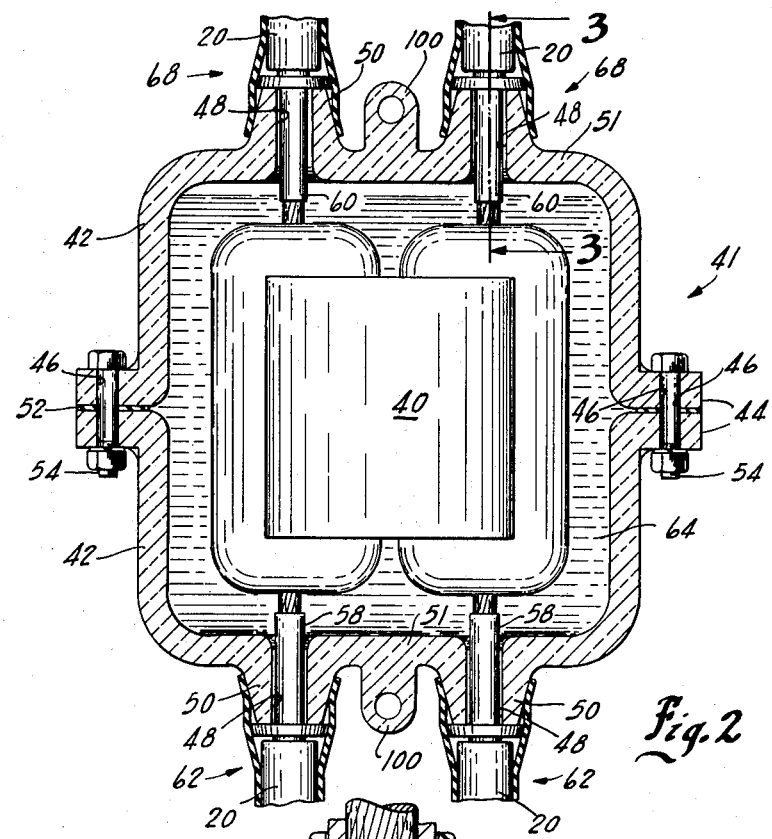
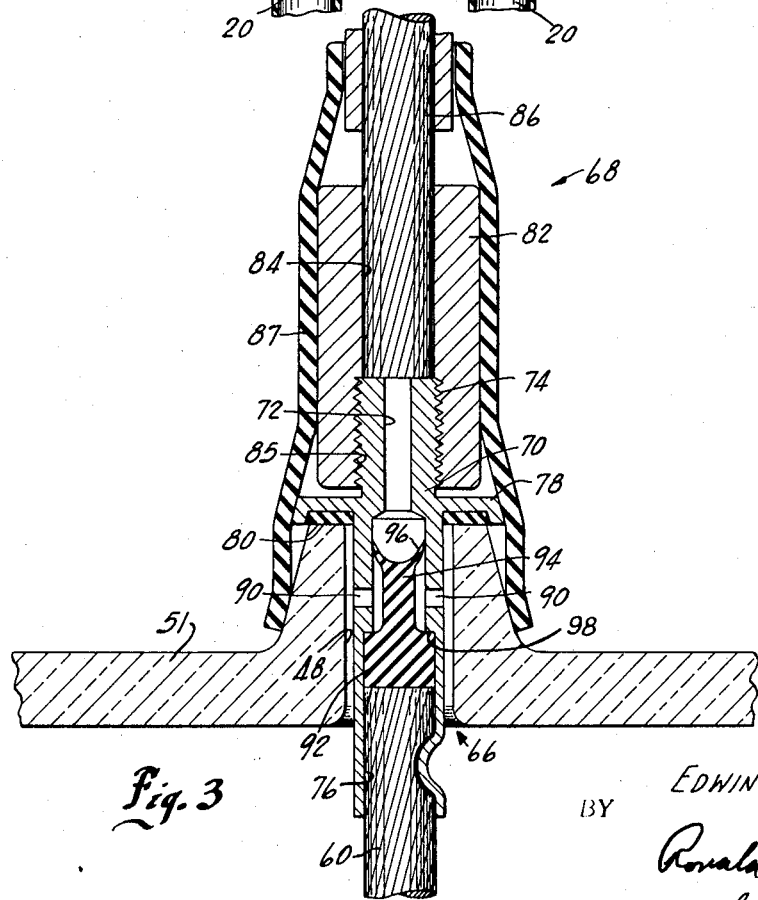

AN UNDER-GROUND VENTED NON-METALLIC TRANSFORMER ASSEMBLY

RELATED APPLICATIONS

This application is a continuation-in-part of my earlier filed application Ser. No. 15,757, filed on Mar. 2, 1970, entitled "Direct Buried Transformer", now abandoned.

BACKGROUND OF THE INVENTION

Underground transmission of power requires the use of direct buried metallic enclosures for the transformers. These enclosures are subject to corrosion due to the various environmental soils and water conditions. Efforts to prevent or minimize corrosion have been directed principally to coating the enclosure with a protective film and providing cathodic protection. The protective film minimizes the area of the enclosure which requires cathodic protection. However, thermal problems resulting from heavily overloaded transformers often render the cathodic protection ineffective. The high temperatures of the transformer tend to drive off moisture leaving a high concentration of corrosive salt adjacent to the tank surfaces causing the environment to lower its electrical conductivity leaving the cathodic protective system ineffective.

Heat dissipation is also a problem in a direct buried transformer. These units dissipate heat by conduction only through the adjacent earth media. The most ideal conditions exist when the soil is wet or damp adjacent to the wall of the enclosure. However, this moisture is evaporated by the heat from the transformer reducing the ability of the adjacent earth media to dissipate heat. Transformers designed for use in the worst environmental soil condition, such as dry soil, are very costly.

SUMMARY OF THE INVENTION

The distribution transformer assembly of the present invention uses a non-metallic enclosure to protect the distribution transformer. A non-corrosive material, such as a plastic or a vitreous material, can be employed to make the transformer enclosure. Plastics have excellent electrical, physical and chemical resistance properties. The vitreous materials have substantially the same properties as the plastics as well as being impervious to water. The enclosure is also provided with a sufficient size to conduct heat losses to the surrounding earth media without exceeding the rated temperature limits of the insulation system of the transformer. Where high temperatures are contemplated, the housing is vented to atmosphere through one of the bushings in the top of the enclosure to minimize the possibility of excessive pressures within the enclosure.

Other objects and advantages of this invention will become apparent when read in connection with the accompanying drawings.

THE DRAWINGS

FIG. 2 is a cross sectional view of an alternate form of the invention;

FIG. 3 is an enlarged view of one of the bushings which are used for venting the transformer to atmosphere taken on line 3—3 in FIG. 2.

DESCRIPTION OF THE INVENTION

Figure 1:
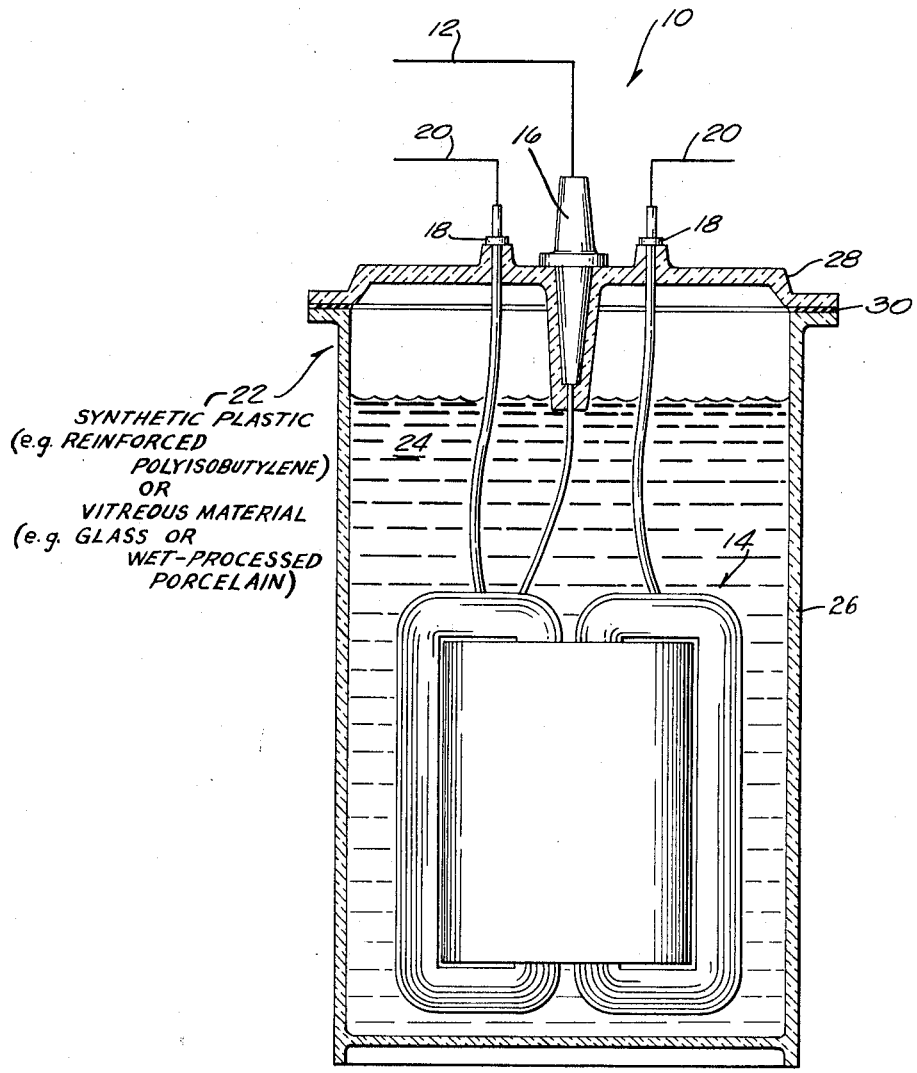
FIG. 1 is a cross sectional view of one embodiment of the present invention.

The distribution transformer assembly 10 of the present invention as shown in FIG. 1 forms a part of a typical distribution system in which a distribution line 12 is connected to a transformer 14 through a cable lead bushing 16 and secondary connections are made to studs or bushings 18 for the service lines 20. The transformer 14 is supported within a fluid-tight enclosure 22 which is substantially completely filled with an insulating fluid 24. The enclosure 22 can then be buried in the ground.

In accordance with the invention, the enclosure 22 includes a tank 26 and a cover 28 both of which are formed of a non-corrosive material such as a plastic or a vitreous material. The cover 28 is sealed to the tank 26 by means of a seal 30 which is made of a non-corrosive material such as "Buna N" rubber. The plastic material which is used to form the enclosure 22 must have excellent electrical, physical and chemical resistance properties and must be impervious to water, acid, alkalies and varying organic matter. Such plastics also have a physical strength comparable to metal and thermal properties equivalent to insulation systems. As an example, the following plastic has been found satisfactory for this use: reinforced polyisobutylene.

The vitreous materials are preferable for forming the enclosure because of their ability to dissipate heat almost as effectively as steel. These materials have all of the properties of plastic as well as being impervious to water, although susceptible to breakage. A wet-processed electrical porcelain has been found to be an excellent material for forming the enclosure.

The transformer is insulated by means of the insulating liquid 24 which has a pour point of approximately −10°C. to plus 20°C. and a boiling point greater than 220°C. The insulating liquid 24 can be any of the conventional type transformer oils having the indicated properties. The tank or enclosure must be of sufficient size to allow the heat losses from the transformer 14 to be dissipated to the surrounding earth media without exceeding the rated temperature limits of the insulation.

TRANSFORMER ASSEMBLY OF FIG. 2

In the embodiment of the invention of FIG. 2, a transformer assembly is shown which includes a distribution transformer 40 enclosed within a housing 41 formed by means of two identical non-metallic sections 42. The sections 42 are made of the same material as described above; however, wet-process porcelain is preferred since it is impervious to water. Each section 42 is in the form of a bell having a flange or lip 44 around the edge of the open end of the bell and a number of openings 46 through each of the flanges. Access to the interior of the bell section 42 is provided by means of openings or passages 48 in bosses 50 provided on the end walls 51 of the bell section. The housing 41 is formed by inverting one of the bell sections 42 and placing the flanges 44 in abutting engagement. Bolts 54 are inserted through holes 46 in the flanges 44 to secure the two sections together. Means are provided between the flanges 44 for hermetically sealing the housing in the form of a gasket 52 made of a non-corrosive material such as "Buna N" rubber. Once sealed, the housing 41 can be buried in the ground.

ONE-WAY VENT TERMINATOR (FIG. 3)

The distribution transformer 40 is mounted within the housing 41 and includes primary winding leads 58 and secondary winding leads 60. The primary winding leads 58 are connected to the distribution line 12 by means of cable lead bushings 62 provided on the bosses 50 on the lower bell section 42. The cable lead bushings 62 are of conventional design and are sealed to the bosses 50 as is generally understood in the art. The housing is filled with an insulating fluid 64 of standard transformer oil as described above. The secondary winding leads 60 are secured to terminators 68 for the service lines 20 as described more fully hereinafter.

Means are provided for venting the transformer housing 41 to relieve gas pressure when operating at high temperatures. Such means is in the form of a one-way check valve assembly 66 provided in at least one of the terminators 68 for the secondary leads 60. The one-way check valve assembly 66 includes a hollow electrically conductive member 70 having an axially extending passage 72. The member 70 is provided with an externally threaded section 74 at one end and an enlarged opening 76 at the opposite end. A radially extending flange 78 is provided intermediate the ends of member 70. The hollow member 70 is mounted on the housing 41 by inserting the end of the member having the enlarged opening 76 into the opening 48 in one of the bosses 50. The threaded section 74 will extend upward externally of the housing 41 for connection to the distribution cable or service line 20. The hollow member 70 is sealed to the boss by means of a bonding agent or material 80 provided between the flange 78 and the boss 50.

The hollow member 70 is connected to the service line 20 by means of an electrically conductive connector 82 having a central passage 84. The connector 82 is provided with an internally threaded section 85 and is screwed onto the threaded section 74. The stranded conductor 86 of the service line 20 is inserted into the passage 84 of the connector 82 into abutting engagement with the end of the threaded section 74 and is secured therein by any appropriate means. A heat shrink tube or tape 87 can be wrapped around the boss 50, connector 82 and service line 20. The hollow member 70 is connected to the secondary lead 60 by inserting the lead 60 into the enlarged opening 76 in the other end of the member 70. It should be noted that the diameter of passage 48 is slightly larger than the diameter of the hollow member 70.

High pressure air from the interior of the housing 41 is vented to atmosphere by means of a number of openings 90 provided in the sides of the member 70 which communicate with the enlarged section 76 in passage 72. The high pressure air is free to pass through passage 72 and out through the strands of conductor 86. In this regard, it should be noted that the stranded conductor of a service line has sufficient openings therein to allow for substantially free flow of air through the conductor to the atmosphere.

The free flow of air into the transformer is prevented by means of a one-way valve element 92 positioned in the enlarged opening 76. The valve element 92 is formed from a resilient material such as rubber and includes a reduced diameter section 94 which terminates in a radial flange 96 having a diameter greater than the opening 76. The flange 96 is located between opening 90 and passage 72. The flange 96 should be turned upward as seen in FIG. 3 of the drawing to allow air to flow past the flange 96 in one direction and to prevent air flow in the other direction. The flange 96 is prevented from moving into engagement with the passage 72 by means of a shoulder 98 provided in opening 76 in a position to engage the enlarged end of the valve element 92.

Although the one-way vent valve assembly 66 has been described in connection with the transformer assembly of FIG. 2, it should be noted that a similar arrangement could be substituted for the secondary connection studs 18 of FIG. 1.

Means are provided in the end walls 51 of the sections 42 for transporting the enclosure. Such means is in the form of an enlarged eye 100 molded as an integral part of the center of the end wall 51.

I claim:

1. An underground distribution transformer assembly for an electrical power distribution system including a low voltage cable, said assembly comprising:
   a fluid-tight water impermeable non-metallic enclosure capable of being buried directly in the ground,
   a distribution transformer positioned within said enclosure and having primary and secondary leads,
   an insulating liquid substantially filling said enclosure, and
   means extending through said enclosure for connecting said transformer leads to the distribution system, at least one of said connecting means for said secondary leads including means for venting the enclosure through the low voltage cable to the atmosphere.

2. The transformer assembly according to claim 1, wherein said enclosure includes a tank and a cover and means sealing said cover to said tank.

3. The transformer assembly according to claim 1 wherein said enclosure comprises two identical bell-shaped sections.

4. The transformer assembly according to claim 1 wherein said enclosure is made of an electrically insulating plastic which is chemically stable.

5. The transformer assembly according to claim 1 wherein s id enclosure is made of a wet-process porcelain.

6. The transformer according to claim 1 wherein said enclosure comprises two identical bell-shaped sections, each of said sections includes an end wall and a number of passages in the end wall, said primary leads being terminated in the passages in the lower section and the secondary leads being terminated in the passages in the upper section.

7. The transformer according to claim 6 wherein said venting means comprises a one-way valve.

8. The transformer according to claim 1 wherein said venting means includes an electrically conductive member having a central passage and a resilient valve element positioned in said passage to provide one-way air flow through the passage.

9. An underground distribution transformer assembly for an electrical power distribution system including a low voltage cable, said transformer assembly comprising:

a fluid-tight non-metallic enclosure formed of electrical porcelain and being capable of being buried directly in the ground, a distribution transformer positioned within said enclosure, an insulating liquid substantially filling said enclosure, and means extending through said porcelain enclosure for connecting said transformer to the distribution system, said connection means including means within said connection means for venting the enclosure through the low voltage cable to atmosphere.

10. The assembly according to claim 9 wherein said enclosure includes two identical sections, each section having connector passages for said connecting means.

11. The assembly according to claim 9 wherein said venting means includes a one-way valve assembly for venting gas under pressure from the enclosure.

12. A non-metallic tank for an underground transformer, said tank comprising a pair of open ended water impermeable non-metallic sections, each section having an end wall and a mounting flange around the outer edge of the open end, means securing said flanges together to form a hermetically sealed enclosure for said transformer, a lead entrance in each of said end walls for terminating said transformer, and a one-way valve mounted in one of said lead entrances for venting said enclosure to a cable.

13. The tank according to claim 12 wherein said sections are formed from electrical porcelain.

14. The tank according to claim 12 wherein said one way valve includes an electrically conductive member having a passage, and a resilient valve element mounted in said passage.

* * * * *